Figure 1:
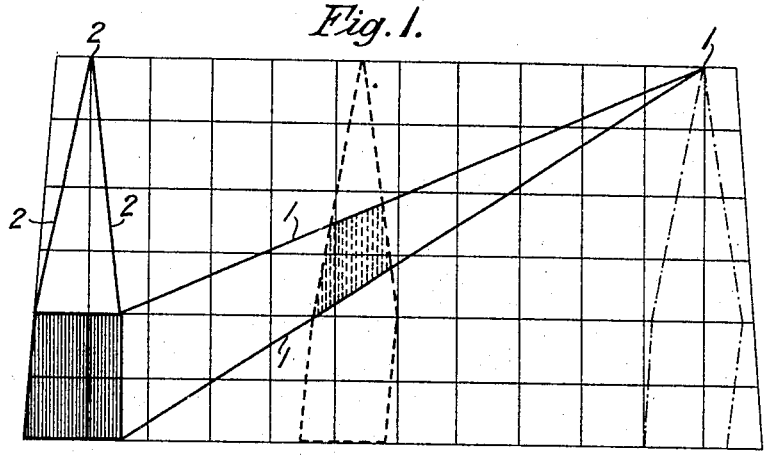

W. E. MUNTZ.
VALVE.
APPLICATION FILED MAY 8, 1919.

1,394,931. Patented Oct. 25, 1921.

Inventor:-
William E. Muntz
by attorneys
Brown Seward

UNITED STATES PATENT OFFICE.

WILLIAM EDGAR MUNTZ, OF LONDON, ENGLAND.

VALVE.

1,394,931. Specification of Letters Patent. Patented Oct. 25, 1921.

Application filed May 8, 1919. Serial No. 295,743.

*To all whom it may concern:*

Be it known that I, WILLIAM EDGAR MUNTZ, a subject of the King of Great Britain, and resident of 24 Southampton Buildings, London, England, late of His Majesty's Public Works Department, India, have invented new and useful Improvements in Valves of which the following is a specification.

The object of this invention is to effect a more delicate graduation of a fluid control generally and is effected by two walls or diaphragms moving over each other. It is applicable to valves such as spigot taps, a form of which is shown to illustrate the invention.

One main essential to obtain the hitherto unattained delicacy of graduation now aimed at is that the whole of the possible relative movement of the two diaphragms over each other shall be utilized in changing the sectional area of inter-registration of at least one pair of slots.

According to my invention I control the flow of fluids by means of two super-imposed members capable of sliding the one over the other, each member having in it a slot which preferably at one end tapers to a point and at the other is of such width that when the wide ends of the slots inter-register there shall be no strangulation of the flow. The center line of the slot in one member is at an angle to the center line of the slot in the other member, the arrangement being such that as one member is moved relatively to the other, the opening afforded by the inter-registration of the slots is progressively increased or decreased throughout substantially the whole length of the slots.

When the invention is applied to a tap, I preferably utilize that part of the peripheries (approximately one third) of the casing and plug previously absorbed in effecting the cut-off by extending the tapering slots in the hollow casing or in the hollow plug or both, without either strangling the full discharge or sacrificing the hermetic metal-to-metal cut-off, so that in a single fluid tap graduation may extend over an angle of rotation of practically 360° and in a double fluid (single tier tap) over 180° for each fluid. It will be obvious that the traverse of one triangular slot over another when each is inclined at a different angle to the line of movement can be so designed as to give a minimum change of inter-registering sectional area for any given length of such movement. Not the least advantage of this arrangement is the elimination of all possibility of "splash" in a single fluid tap by reason of a change of hand being obligatory to operate the tap from shut to fully opened.

Advantage will usually be taken of the plug being conical to position the widest or "full open" ends of the slots in or near the angle formed by the periphery with the larger end of the cone spigot plug. In the single fluid tap the best results will usually be obtained by piercing the concave periphery of the casing with a tapering slot along the spiral center line between the two ends of the female truncated cone, the widest end of such slot being a rhomboid equal in area to the inlet pipe and having its shortest side parallel with the widest extremity of the cone, so that the angle of rotation it subtends (which is "dead") is the smallest convenient.

The corresponding slot in the spigot plug preferably takes the form of an isosceles triangle having its longitudinal center line parallel to the axis of rotation. The extreme point of the casing slot, to avoid any overlapping of the widest end of the two slots, must terminate on a line parallel with the rotary axis and bisecting the shorter side of the rhomboid at the widest end of the slot, and for this reason it is desirable to have the wider ends of the slots as narrow as may permit of the full unrestricted inflow, in order that the graduation may be spread over as large an angle of spigot rotation as possible.

For instance, with a one inch supply pipe of a cross sectional area of ¾ of a square inch, the shorter side of the rhomboid at right angles to the axis of rotation might be ½ an inch, which if the larger diameter of the plug is 4 inches would give a "dead" arc of under 15° or a total effective angle of rotation of 345° between shut and full open.

A "stop" may be employed to prevent any part of the wider ends of the slot overlapping.

Figure 2:
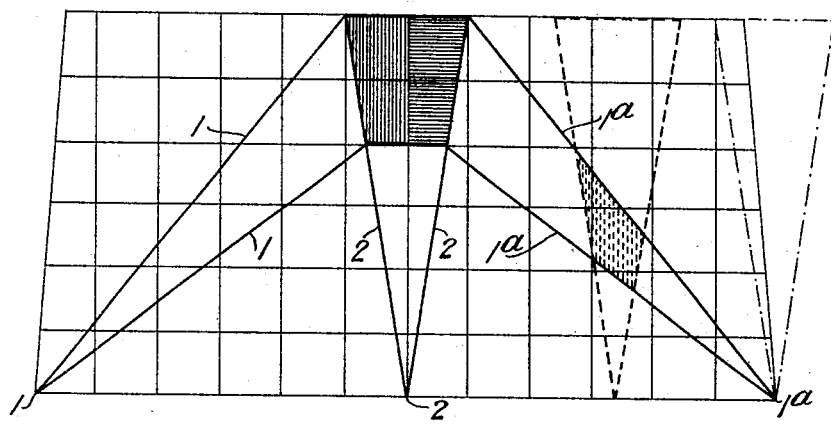
Figure 3:
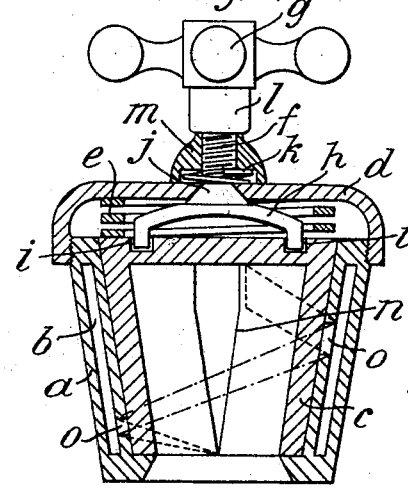

In the accompanying drawing which illustrates the invention, Figure 1 is a diagram showing the invention when arranged for the control of a single fluid. Fig. 2 is a similar diagram showing how two fluids can be simultaneously controlled. Fig. 3 is a sectional elevation of single fluid spigot tap embodying my improvement.

Referring to Fig. 1, the lines 1, 1, represent a tapered slot in a tap casing developed, that is to say, laid out flat, communicating with a fluid inlet. The lines 2, 2, represent a tapered slot in a hollow spigot laid out flat, communicating with the interior. It will be observed that when the tapered slots within the lines 1, 1, and 2, 2, move over one another by the rotation of the spigot the intersecting portions vary in area so that a very gradual regulation of a passing fluid is obtained from the heavily shaded portion shown in the left to the point of actual closure which is reached when the narrowest points of the two slots touch and leave one another at the last square on the right of the diagram. The dotted lines and shading show an intermediate position between maximum opening and closure.

In Fig. 2, the casing has two slots 1 and 1ª extending in opposite directions and each communicating with a separate fluid supply. 2 is a V shaped slot in the spigot capable of being superimposed on either slot 1 or 1ª, or on both simultaneously, as is the case in the position shown in full lines where the shading indicates the maximum opening to two fluids. Movement right or left of the two graduations proportions the supply of the fluids until one is entirely cut off, and ultimately both, as in the case of Fig. 1. In Fig. 3, $a$ is a hollow casing surrounding the cavity $b$ to which fluid is admitted through any convenient inlet (not shown). $c$ is the spigot plug within the said casing. $d$ is a cap screwed on to the top of the casing, covering in the plug $c$. $e$ is a compression spring between the closed-in top of the plug $c$ and the underside of the cap $d$ to hold the plug to its seat. $f$ is a spindle extending through the cap $d$ having at one end the handle $g$ and at the other the claw $h$, the ends of which claw engage with holes $i\ i$ in the head of the plug. $j$ is a cone on the spindle $f$ closing the orifice in the cap $d$ through which the spindle passes. $k$ is a spring washer on the upper side of the cap. $l$ is an enlargement on the spindle and $m$ is a screw cap inclosing the washer $k$. $n$ is a V shaped slot in the plug $c$ and $o$ is a tapered slot arranged spirally in the inner wall of the hollow casing $a$.

In the position shown in the drawing (Fig. 3) the tap is closed. By turning the spigot anti-clockwise, the point of the V shaped spigot slot meets the point of the tapered casing slot and by further turning an intersection of wider portions of the slots takes place resulting in a gradually increasing flow of liquid between the interior of the casing and the interior of the plug, which discharges from the bottom end through the opening provided in it and in the bottom of the casing.

It will be understood that various changes may be resorted to in the form, construction and arrangement of the several parts without departing from the spirit and scope of my invention and hence I do not intend to be limited to the details herein shown and described, except as they may be included in the claims.

What I claim is:—

1. In a device of the character described, the combination of two members, means for holding the two members in fluid tight contact, and means for moving one member relatively to the other, each member having in it a slot that tapers to a point, the center lines of the two slots being inclined to one another and the slots being so arranged that, as the one member is moved relatively to the other from the position in which the points of the two slots register with one another, the area of the portion of each slot which registers with the other increases throughout the movement.

2. In a device of the character described, the combination of two members, means for holding the two members in fluid tight contact, and means for moving one member relatively to the other, each member having in it a slot that tapers to a point, the slot in a member extending substantially across it, the center lines of the two slots being inclined to one another and the slots being so arranged that, as the one member is moved relatively to the other from the position in which the points of the two slots register with one another, the area of the portion of each slot which registers with the other increases throughout the movement.

3. In a device of the character described, the combination of two members, means for holding the two members in fluid tight contact, and means for moving one member relatively to the other, each member having in it a slot that tapers to a point, the slot in each member extending substantially across it, the center lines of the two slots being inclined to one another and the slots being so arranged that, as the one member is moved relatively to the other from the position in which the points of the two slots register with one another, the area of the portion of each slot which registers with the other increases throughout the movement.

4. In a device of the character described, the combination of a hollow casing and a hollow spigot plug, means for holding the plug in fluid tight contact with said casing, an actuating spindle, a claw coupling on said spindle adapted to turn said plug, said casing having a slot tapering to a point, said plug having a slot tapering to a point, the center lines of the two slots being inclined to one another and the slots being so arranged that, as the plug is turned in the casing from the position in which the points of the two slots register with one another, the area of the portion of each slot which registers with the other increases throughout the movement.

5. In a device of the character described, the combination of a hollow casing and a hollow spigot plug, means for holding the plug in fluid tight contact with said casing, an actuating spindle, a claw coupling on said spindle adapted to turn said plug, said casing having a slot tapering to a point and extending substantially across it, said plug having a slot tapering to a point, the center lines of the two slots being inclined to one another and the slots being so arranged that, as the plug is turned in the casing from the position in which the points of the two slots register with one another, the area of the portion of each slot which registers with the other increases throughout the movement.

6. In a device of the character described, the combination of a hollow casing and a hollow spigot plug, means for holding the plug in fluid tight contact with said casing, an actuating spindle, a claw coupling on said spindle adapted to turn said plug, said casing having a slot tapering to a point, said plug having a slot tapering to a point and extending substantially across it, the center lines of the two slots being inclined to one another and the slots being so arranged that, as the plug is turned in the casing from the position in which the points of the two slots register with one another, the area of the portion of each slot which registers with the other increases throughout the movement.

In testimony that I claim the foregoing as my invention I have signed my name this eleventh day of April, A. D. 1919.

WILLIAM EDGAR MUNTZ.